United States Patent
Khanka et al.

(10) Patent No.: US 8,913,566 B1
(45) Date of Patent: Dec. 16, 2014

(54) USING TRAFFIC CHANNELS TO EXTEND WIRELESS COVERAGE IN POOR PILOT-SIGNAL CONDITIONS

(75) Inventors: Bhagwan Khanka, Lenexa, KS (US); Manoj Shetty, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1132 days.

(21) Appl. No.: 12/758,623

(22) Filed: Apr. 12, 2010

(51) Int. Cl.
 *H04W 4/00* (2009.01)
(52) U.S. Cl.
 USPC .......................................... 370/329; 370/338
(58) Field of Classification Search
 USPC .................. 370/310–350; 455/126–127.5
 See application file for complete search history.

(56) References Cited

U.S. PATENT DOCUMENTS

| | | | |
|---|---|---|---|
| 5,764,630 A | 6/1998 | Natali et al. | |
| 5,966,670 A | 10/1999 | Keskitalo et al. | |
| 6,005,854 A | 12/1999 | Xu et al. | |
| 6,069,884 A | 5/2000 | Hayashi et al. | |
| 7,092,431 B2 | 8/2006 | Maeda et al. | |
| 7,154,915 B1 | 12/2006 | Ushirokawa et al. | |
| 2002/0034213 A1* | 3/2002 | Wang et al. | 375/132 |
| 2005/0013380 A1 | 1/2005 | Kim et al. | |
| 2006/0087994 A1* | 4/2006 | Barth et al. | 370/310 |
| 2006/0135194 A1* | 6/2006 | Rensburg et al. | 455/522 |
| 2007/0121560 A1* | 5/2007 | Edge | 370/338 |
| 2007/0263734 A1* | 11/2007 | Seki | 375/259 |
| 2009/0042596 A1* | 2/2009 | Yavuz et al. | 455/522 |
| 2011/0051625 A1* | 3/2011 | Bender et al. | 370/254 |

\* cited by examiner

*Primary Examiner* — Andrew Chriss
*Assistant Examiner* — Kenan Cehic

(57) ABSTRACT

Methods and systems use traffic channels to extend wireless coverage areas. In an embodiment, an access node transmits a standard pilot signal over a pilot channel. The access node initially operates in a standard transmission mode, wherein the access node transmits a standard traffic signal over a traffic channel at a first power level. The access node makes a determination to operate in an alternative transmission mode involving the access node generating and transmitting a modified traffic signal comprising (i) a standard traffic signal and (ii) a modified pilot signal. The access node transmits the modified traffic signal at a second power level that is greater than the first power level.

22 Claims, 8 Drawing Sheets

USING TRAFFIC CHANNELS TO EXTEND WIRELESS COVERAGE IN POOR PILOT-SIGNAL CONDITIONS

BACKGROUND

1. 1x Wireless-Communication Networks Generally

Many people use wireless-communication devices, such as cell phones and personal digital assistants (PDAs), to communicate with cellular wireless networks. These wireless-communication devices and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1 xRTT networks" (or "1x networks" for short), which stands for "Single Carrier Radio Transmission Technology." These networks typically provide communication services such as voice, Short Message Service (SMS) messaging, and packet-data communication.

Wireless-communication devices typically conduct these wireless communications with one or more base transceiver stations (BTSs), each of which sends communications to and receive communications from wireless-communication devices over the air interface. Each BTS is in turn communicatively connected with an entity known as a base station controller (BSC), which (i) controls one or more BTSs and (ii) acts as a conduit between the BTS(s) and one or more switches or gateways, such as a mobile switching center (MSC) and/or packet data serving node (PDSN), which may in turn interface with one or more signaling and/or transport networks.

Wireless-communication devices and base stations conduct communication sessions (e.g. voice calls and data sessions) over frequencies known as carriers, each of which may actually be a pair of frequencies, with the base station transmitting to the wireless-communication device on one of the frequencies, and the wireless-communication device transmitting to the base station on the other. The base-station-to-mobile-station link is known as the forward link, while the mobile-station-to-base-station link is known as the reverse link.

Wireless-communication devices can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

2. Pilot Channels and Traffic Channels Generally

Using a sector as an example of a coverage area, BTSs may provide service in a given sector on one carrier, or on more than one. An instance of a particular carrier in a particular sector is referred to herein as a sector/carrier. In a typical CDMA system, using a configuration known as radio configuration 3 (RC3), a BTS can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a BTS instructs a wireless-communication device that is operating on a given sector/carrier to use a particular traffic channel for a communication session, the BTS does so by instructing the wireless-communication device to tune to one of the 61 traffic channels on that sector/carrier. It is over that assigned traffic channel that the BTS will transmit forward-link data to the wireless-communication device during the ensuing communication session. In addition to that forward-link channel, the traffic channel also includes a corresponding Walsh-coded reverse-link channel, over which the wireless-communication device transmits data to the BTS.

The BTS also continuously transmits on the pilot channel a pilot signal that can be picked up by nearby wireless-communication devices. In general, the pilot channel functions to alert wireless-communication devices in a given sector of the presence of a service-providing BTS. Typically, the pilot channel also conveys a value known as a pseudorandom number (PN) offset, which identifies the sector; in particular, by being offset from CDMA system time by a certain amount of time, the pilot channel conveys the PN offset. Wireless-communication devices generally use the pilot channel to coherently detect and demodulate, or decode, the signal on a sector/carrier, including communications sent on the traffic channel.

3. Pilot and Traffic Signal Transmission Power

Typically, the power level at which the pilot signal is transmitted is at least as high as the power at which signals on any other channel are transmitted, including the traffic signals. The pilot-signal power level is typically fixed at a certain level, and the pilot-signal power level therefore typically serves as a maximum transmit power for signals transmitted on all other channels. Conversely, the power level at which the traffic signals are transmitted may vary in time depending on a variety of considerations, including forward-link RF conditions.

Wireless-communication devices typically continuously compute a forward-link frame error rate (FFER) which is a ratio of the number of error-containing frames that the wireless-communication device receives to the total number of frames that the wireless-communication device receives over a given period of time. If the FFER exceeds a desirable amount, a wireless-communication device might report that fact to the BTS, and the BTS will then increase the forward-link transmission power to the wireless-communication device on the traffic channel. Other things being more or less equal, the more power that the base station allocates to a given wireless-communication device, the lower the wireless-communication device's FFER will be.

Nonetheless, a wireless-communication device typically is not allowed to request an increase in the BTS transmit power of the traffic signal to a level that is greater than the transmit power of the pilot signal. As one practical consideration, increasing the power at which the traffic signal is transmitted would normally be ineffective without correspondingly increasing the power at which the pilot signal is transmitted such that the wireless-communication device would also be able to receive the pilot signal for decoding the traffic signal. Accordingly, it is generally understood that the power level of the pilot signal, and its associated geographic reach, corresponds to the limit of the coverage area for a given BTS.

OVERVIEW

Typically the coverage area of a particular BTS in a wireless-communication network is limited by the reach of the pilot signal it broadcasts because, as a wireless-communication device moves throughout the sector, the pilot signal is required by the wireless-communication device to decode traffic. Wireless-communication devices that receive a weak pilot signal may have trouble decoding traffic and therefore may experience significant service degradation including even dropped calls. A wireless-communication device might receive a weak pilot signal in a variety of situations including, for example, when the wireless-communication device is on the boundary of a coverage area, when there is a large number of wireless-communication devices in a sector causing an overall degradation of the pilot signal, when there is a large amount of air interference between the wireless-communication device and the BTS, or especially when there is a combination of these and/or other detrimental conditions.

It is undesirable in many cases to increase the power, or improve the standard coverage, of the pilot signal because such a power increase will result in an increase of network noise that may degrade the experience of wireless-communication devices that do not require that the pilot signal be transmitted at a higher power.

Accordingly, disclosed herein are methods and systems that allow for an improved coverage mechanism for wireless-communication devices that are receiving an inadequate pilot signal. The present methods and systems take advantage of the variability of the traffic-channel power in a wireless-communication system, by combining the pilot signal and the traffic signal into a modified traffic signal and transmitting the modified traffic signal over the traffic channel at an increased power level. Thereby, the pilot signal is provided on the traffic channel and, as a result, a wireless-communication device may receive the pilot signal in otherwise poor pilot-signal conditions.

In accordance with the present disclosure, an access node transmits a standard pilot signal over a pilot channel. The access node also initially operates in a standard transmission mode, wherein the access node transmits a standard traffic signal over a traffic channel at a first power level. While operating in the standard transmission mode, the access node makes a determination to operate in an alternative transmission mode comprising the access node generating and transmitting a modified traffic signal comprising (i) the standard traffic signal and (ii) a modified pilot signal. The access node transmits the modified traffic signal over the traffic channel at a second power level that is greater than the first power level.

Further, in accordance with the present disclosure, a wireless-communication device initially operates in a standard reception mode, wherein the wireless-communication device monitors the pilot channel for the standard pilot signal and receives the standard traffic signal on the traffic channel. While operating in the standard reception mode, the wireless-communication device makes a determination to operate in an alternative reception mode comprising the wireless-communication device ceasing monitoring the pilot channel for the pilot signal, receiving over the traffic channel the modified traffic signal, and using the modified pilot signal to decode the standard traffic signal.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings.

DETAILED DESCRIPTION OF THE DRAWINGS

1. Exemplary Architecture a. Exemplary Communication System

Figure 1:
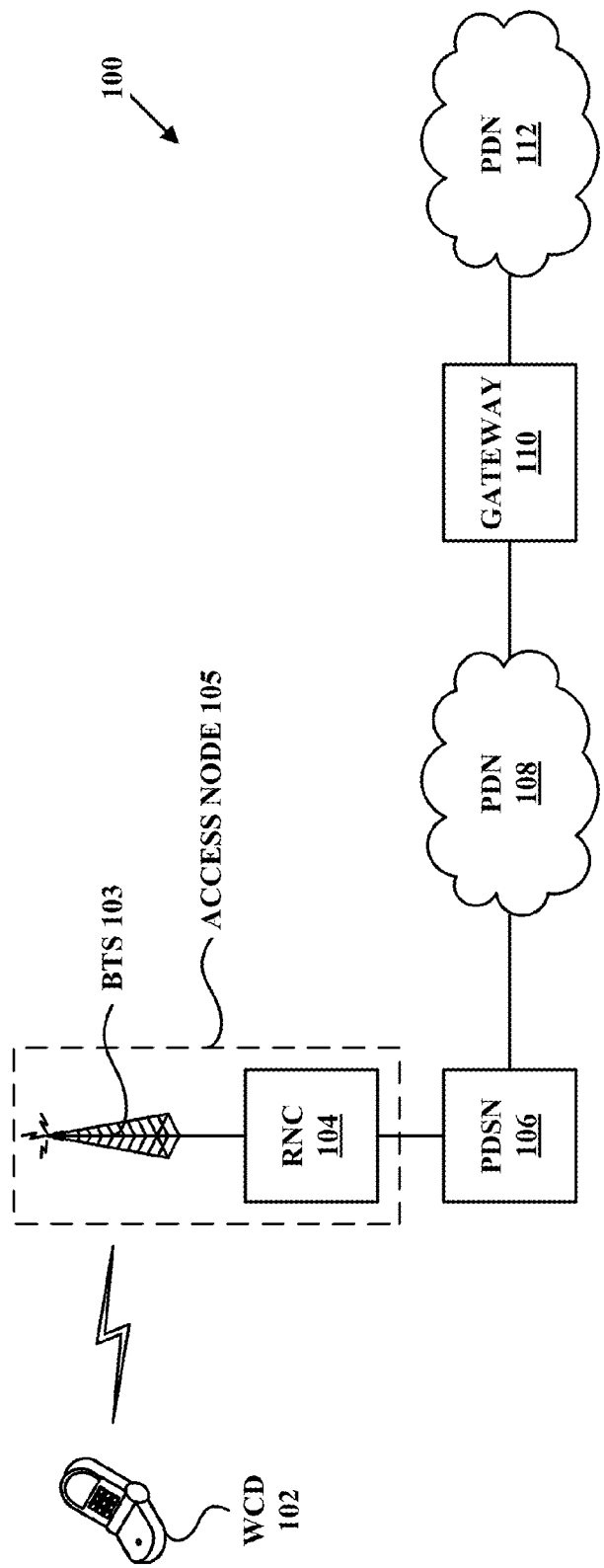
FIG. 1 is a simplified block diagram of a communication system, in accordance with at least one embodiment.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes wireless-communication device (WCD) 102, an access node 105 (shown as comprising a BTS 103 and an RNC 104), a PDSN 106, a packet-data network (PDN) 108, a gateway 110, and a PDN 112. Additional entities not depicted could be present as well. For example, there could be additional wireless-communication devices in communication with access node 105; also, there could be additional entities in communication with PDN 108 and/or PDN 112. Also, there could be one or more routers, switches, other devices, and/or other networks making up at least part of one or more of the communication links.

WCD 102 may be any device arranged to carry out the wireless-communication-device functions described herein, and may include a user interface, a wireless-communication interface, a processor, and data storage containing instructions executable by the processor for carrying out those access-terminal functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also or instead be able to communicate with a 1 xRTT CDMA network, a Wi-Fi (IEEE 802.11) network, and/or one or more additional types of wireless networks. The processor and data storage may be any suitable components known to those of skill in the art. As examples, WCD 102 could be a cell phone, a PDA, a computer, a laptop computer, a hybrid IS-1050/IS-856 device, and/or a multi-mode Wi-Fi/cellular device.

BTS 103 may be any one or any combination of network elements arranged to carry out the BTS functions described herein, and may include a communication interface, a processor, and data storage containing instructions executable by the processor to carry out those BTS functions. The communication interface may include one or more antennas and chipsets or other components for providing one or more coverage areas such as cells or sectors according to a protocol such as CDMA, EV-DO, WiMax, or any other suitable protocol. The communication interface may also include a wired or wireless packet-data interface (which may be characterized as a backhaul connection), such as an Ethernet interface, for communicating with RNC 104.

RNC 104 may be any one or any combination of network elements arranged to carry out the RNC functions described herein. As such, RNC 104 may include a communication interface, a processor, and data storage containing instructions executable by the processor to carry out those RNC functions. The communication interface may include a wired or wireless packet-data interface (which may be characterized as a backhaul connection), such as an Ethernet interface, for communicating directly or over one or more networks with PDSN 106. In general, RNC 104 functions to control one or more BTSs, and to serve as a conduit between the one or more BTSs and PDSN 106, enabling wireless-communication devices to communicate over PDN 108 and perhaps beyond.

PDSN 106 may be any networking server or other device arranged to carry out the PDSN functions described herein. PDSN 106 may include a communication interface, a processor, and data storage containing instructions executable by the processor for carrying out those PDSN functions. The communication interface may include a wired packet-data interface such as an Ethernet interface for communicating with access node 105 and/or over PDN 108. Note that PDSN 106 may, instead or in addition, comprise a wireless-communication interface for communicating with access node 105 and/or over PDN 108. Note also that PDSN 106 may use the same interface or separate interfaces for communicating with access node 105 and for communicating over PDN 108. PDSN 106 may generally function to provide access node 105 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 105 and PDSN 106), while PDN 112 is the Internet. However, this is for illustration and not by way of limitation. In some embodiments, PDSN 106 may connect directly to the Internet, in which case PDN 108 and gateway 110 may not be necessary. Other configurations are certainly possible as well.

Gateway 110 may be any networking server or other device arranged to carry out the gateway functions described herein. Thus, gateway 110 may include a communication interface, a processor, and data storage containing instructions executable by the processor for carrying out those gateway functions. The communication interface may include a wired packet-data interface, such as an Ethernet interface, for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

b. Exemplary Access Node

As described above with reference to FIG. 1, access node 105 may comprise BTS 103 and RNC 104, and access node 105 may comprise one or more additional BTSs as well. In general, access node 105 provides wireless service to wireless-communication devices, such as WCD 102, over an air interface, and uses a backhaul connection to provide transport service over PDN 108 (or perhaps PDN 108 and PDN 112) to those wireless-communication devices. Certain methods described herein may be carried out at least in part by access node 105.

Figure 2:
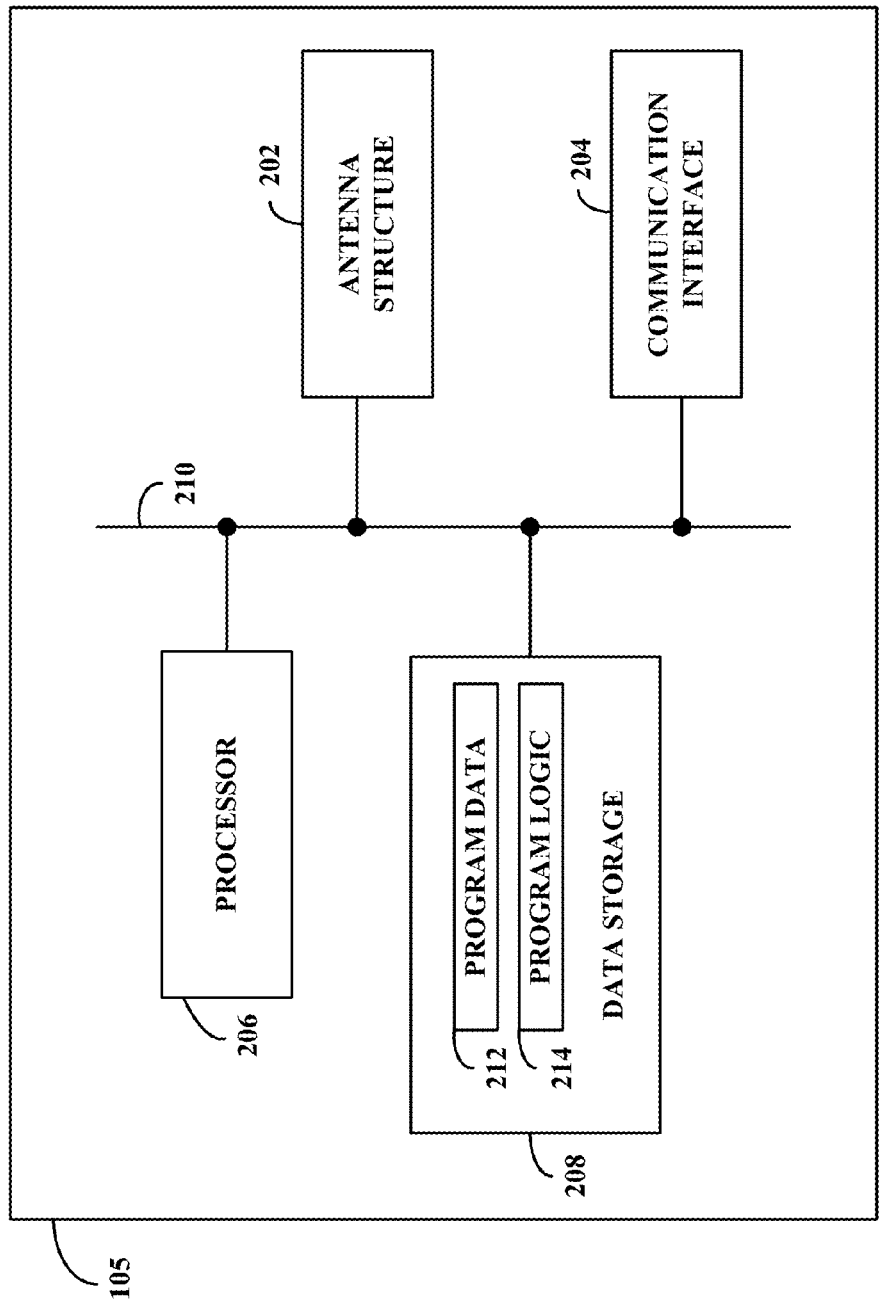
FIG. 2 is a simplified block diagram illustrating an access node, showing functional components that can operate to carry out aspects of at least one embodiment.

Accordingly, FIG. 2 is a simplified block diagram of access node 105, showing functional components that can operate to carry out functions described herein. As shown in FIG. 2, the exemplary access node 105 includes, without limitation, an antenna structure 202, a communication interface 204, a processor 206, and data storage 208, all linked together via a system bus, network, or other connection mechanism 210. The exemplary access node 105 may also include other and/or different components.

The antenna structure 202 of the access node 105 may provide one or more air interfaces over which wireless-communication device 102 may communicate with access node 105. The antenna structure 202 may be arranged in various ways. For example, the antenna structure 202 may include one or more antennas. The one or more antennas may include one or more omni-directional antennas and/or one or more directional (e.g., sectored) antennas. Alternatively, the one or more antennas may include one or more antennas for receiving RF signals and one or more antennas for transmitting RF signals from the antenna structure 202.

The communication interface 204 preferably functions to communicatively couple the access node 105 to other networks, such as the PDSN 106. As such, perhaps corresponding to the above-described communications interface of the RNC, communication interface 204 may include a wired and/or wireless packet-data interface, such as an Ethernet interface, for communicating directly or over one or more networks with PDSN 106. The access node 105 may also include multiple communication interfaces 204, such as one via which the access node 105 sends communication, and one via which the access node 105 receives communication.

The processor 206 may comprise one or more general purpose microprocessors and/or dedicated signal processors. Data storage 208, in turn, may comprise memory and/or other storage components, such as optical, magnetic, organic or other memory disc storage, which can be volatile and/or non-volatile, internal and/or external, and integrated in whole or in part with the processor 206. Data storage 208 preferably contains or is arranged to contain (i) program data 212 and (ii) program logic 214. Although these components are described herein as separate data storage elements, the elements could just as well be physically integrated together or distributed in various other ways. For example, the program data 212 may be maintained in data storage 208 separate from the program logic 214, for easy updating and reference by the program logic 214.

Program data 212 may contain information about the wireless coverage areas of the access node 105. Program data 212 may also contain information about the identity of WCD 102. Program logic 214 may comprise machine language instructions that may be executed or interpreted by the processor 206 to carry out functions according to the methods described herein, including the functions described with respect to FIG. 3. It should be understood, however, that the program logic 214 and its associated functions are described herein be way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

2. A First Exemplary Method

Figure 3:
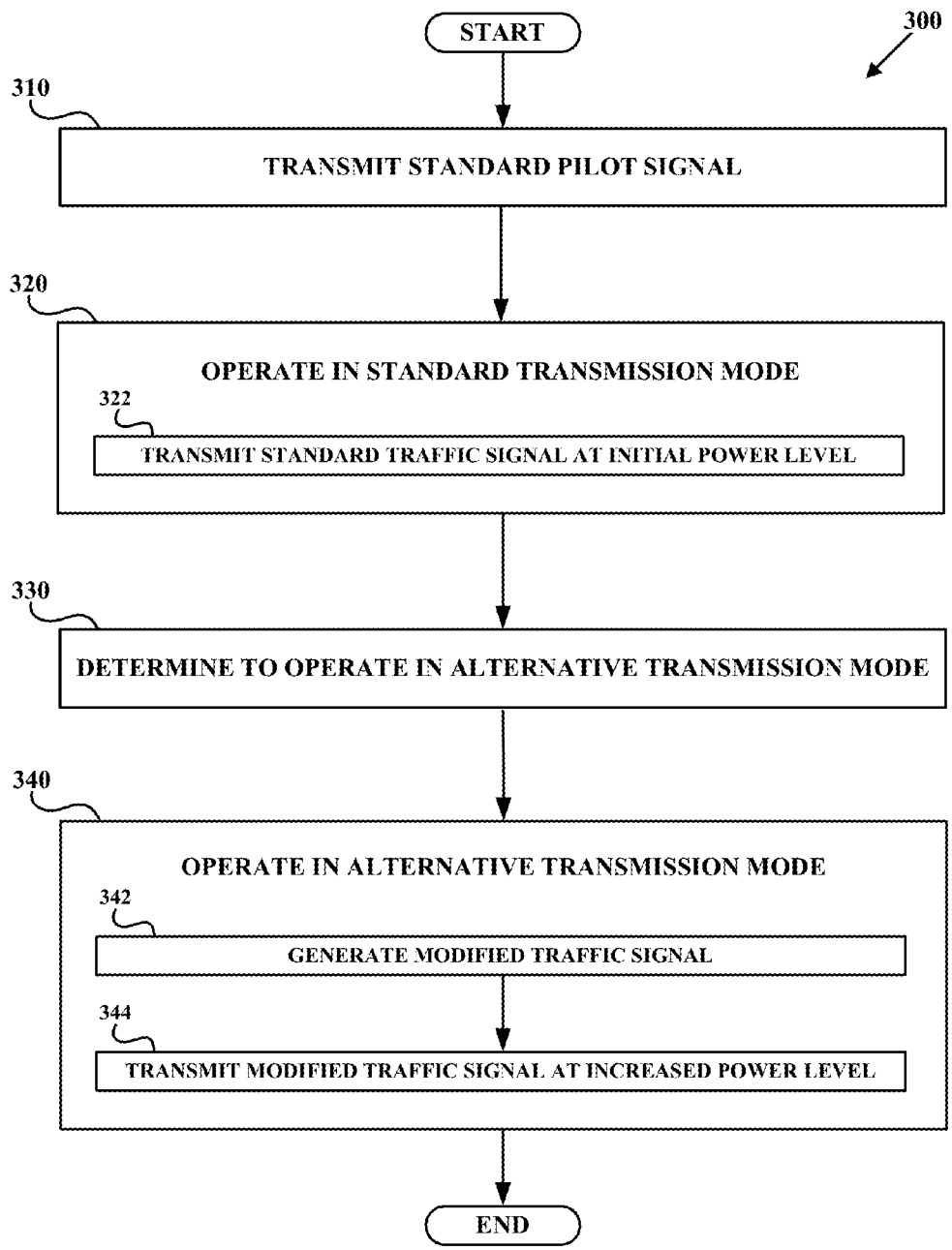
FIG. 3 is a flow chart illustrating a method, in accordance with at least one embodiment.

FIG. 3 depicts an method that may be carried out by an access node such as access node 105. Although method 300 is described herein as being carried out by access node 105, this is not required; in general, particular steps of method 300 may be carried out by an access node, a BTS, an RNC, a PDSN, one or more other network entities, or some combination thereof.

a. Transmit Standard Pilot Signal

At step 310, access node 105 transmits standard pilot signal 410 over a pilot channel. Generally, standard pilot signal 410 may be transmitted by access node 105 continuously and at a standard pilot-signal power level.

Figure 4A:
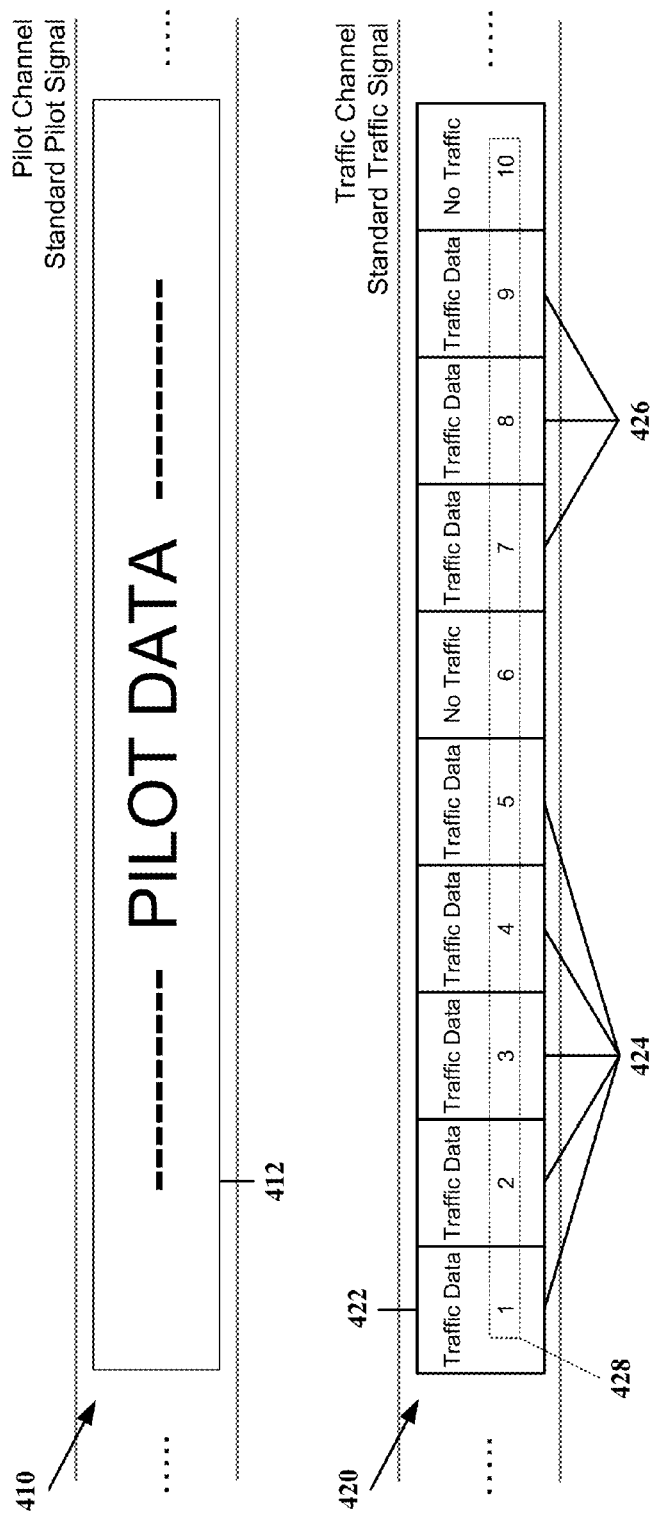
FIG. 4 is a simplified block diagram depicting wireless-communication signals, in accordance with at least one embodiment.

With reference to FIG. 4a, standard pilot signal 410 may include standard pilot data 412. Standard pilot data 412 may comprise data that alerts wireless-communication devices in the sector served by access node 105 of the presence of access node 105. In particular, standard pilot data 412 may comprise a PN offset. As noted, the PN offset identifies the sector being served by access node 105 and indicates that standard pilot signal 410 is offset from CDMA system time by a certain amount. As will be discussed further, WCD 102 may use pilot signal 410, or more particularly, may use the PN offset indicated by pilot data 412, to decode standard traffic signal 420 sent on the traffic channel, also depicted in FIG. 4a.

b. Operate in Standard Transmission Mode

At step 320, access node 105 operates in a standard transmission mode. Operating in the standard transmission mode comprises, at step 322, transmitting standard traffic signal 420 over a traffic channel at a first, or initial, power level. The first power level at which standard traffic signal 420 is transmitted may typically be, but is not necessarily, less than the power level at which standard pilot signal 410 is transmitted. It should further be noted that standard traffic signal 420 may be transmitted at a single, constant, power level such as the first power level, while access node 105 operates in the standard transmission mode. However, access node 105 may alternatively transmit standard traffic signal 420 at various power levels including, but not limited to, the first power level, while operating in the standard transmission mode.

For example, while operating in the standard transmission mode, access node 105 may receive various requests from WCD 102 to increase the power level at which standard traffic signal 420 is transmitted. Access node 105 may respond to such requests by, among other things, increasing the power level at which standard traffic signal 420 is transmitted. Alternatively, while operating in the standard transmission mode, access node 105 may make a determination that the total power at which all traffic signals being transmitted by access 105 is too high. Access node 105 may respond to such a determination by, among other things, decreasing the power level at which standard traffic signal 420 is transmitted.

Standard traffic signal 420 may include traffic data 422. Traffic data 422 may be transmitted in several of time slots 428 which, in FIG. 4a, are respectively numbered 1-10. Furthermore, standard traffic signal 420 may comprise a single continuous traffic signal, or may be made up of multiple distinct traffic signals each comprising traffic data 422. For example, standard traffic signal 420 includes a first traffic signal 424 transmitted during time slots 1-5, and standard traffic signal 420 also includes a second traffic signal 426 transmitted during time slots 7-9. Note that, traffic data 422 might not be transmitted during each of the time slots 428. For example, during time slot 6, as well as time slot 10, no traffic data is transmitted.

c. Determine to Operate in Alternative Transmission Mode

At step 330, access node 105 makes a determination to operate in an alternative transmission mode. As discussed below with reference to step 340, operating in the alternative transmission mode may include generating a modified traffic signal, such as modified traffic signal 450 depicted in FIG. 4b, or modified traffic signal 480 depicted in FIG. 4c. Modified traffic signal 450 (480) may comprise standard traffic signal 420 and modified pilot signal 452 (482). Operating in the alternative transmission mode may further include transmitting modified traffic signal 450 (480) at a second power level that is greater than the first power level at which standard traffic signal 420 was initially transmitted.

In general, access node 105 may determine to operate in the alternative transmission mode for the purpose of improving the reception of pilot data 412 and/or traffic data 422 by WCD 102. Access node 105 may determine to operate in the alternative transmission mode for other purposes as well.

i. Determination Based on Communication Service

Returning to step 330, the determination to operate in the alternative transmission mode may comprise a determination that the traffic channel is providing a packet-data communication service to WCD 102. Because operating in the alternative transmission mode may include transmitting traffic data 422 as well as pilot data 412 on the traffic channel, the alternative transmission mode may not be conducive to communication services requiring continuous, uninterrupted transmission of traffic data 422, as may be the case with voice communication services. It may therefore be desirable for access node 105 to not operate in the alternative transmission mode when access node 105 is providing such communication services. Instead, it may be desirable for access node 105 to only operate in the alternative transmission mode when providing communication services that may be more conducive to non-continuous data transmissions, such as packet-data communication services.

Figure 4B:
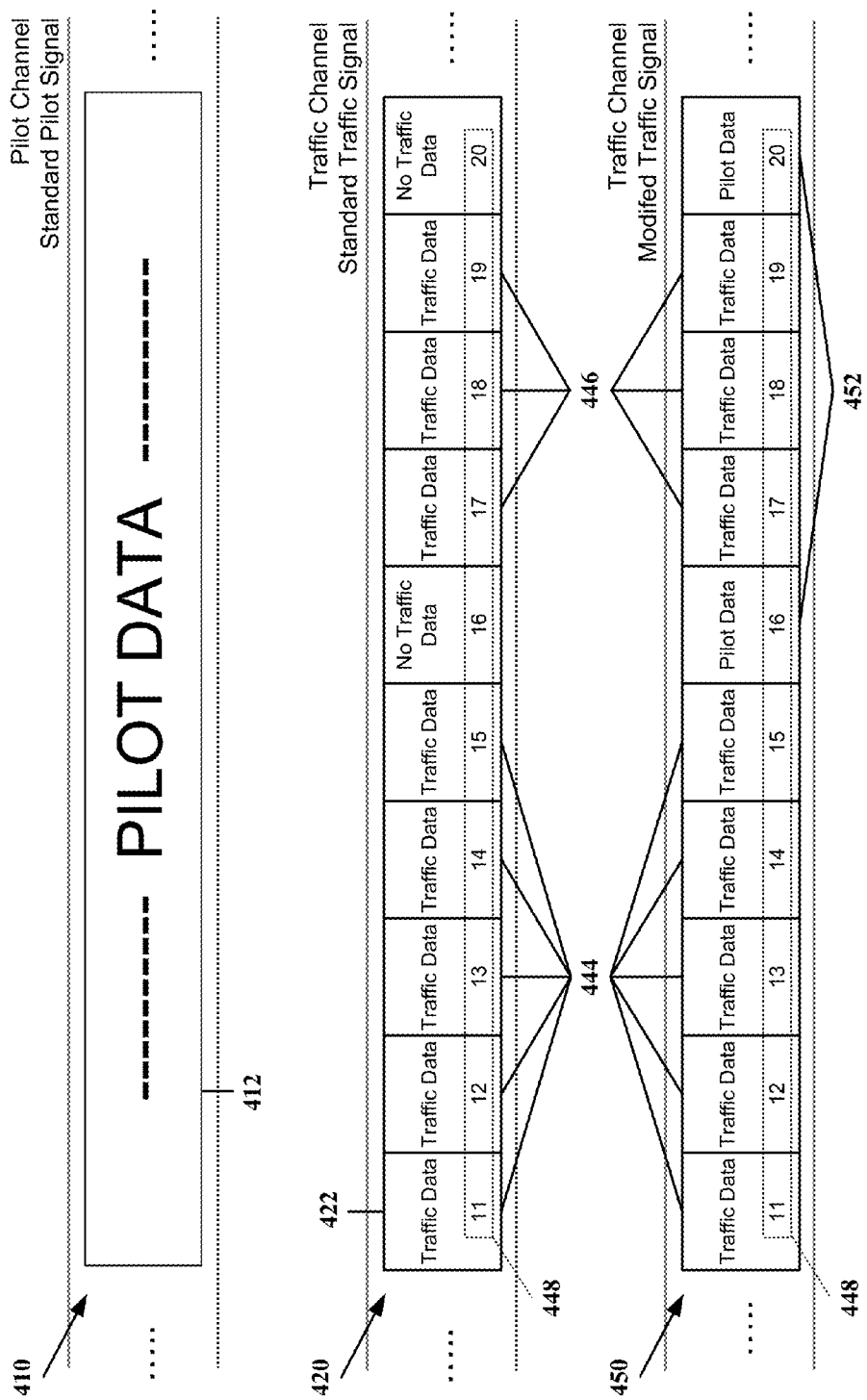

For example, with reference to FIG. 4b, packet-data communication services may be generally characterized by periods of data transmission, such as traffic signal 444 transmitted during time slots 11-15 and traffic signal 446 transmitted during time slots 17-19, as well as intermittent periods of no data transmission, such as during time slot 16 and time slot 20. Thus, it may be desirable to transmit pilot data 412 during time slots otherwise associated with no traffic data transmission, such as time slot 16 and time slot 20, and thereby not otherwise disrupt the flow of traffic data 422 on the traffic channel.

Figure 4C:
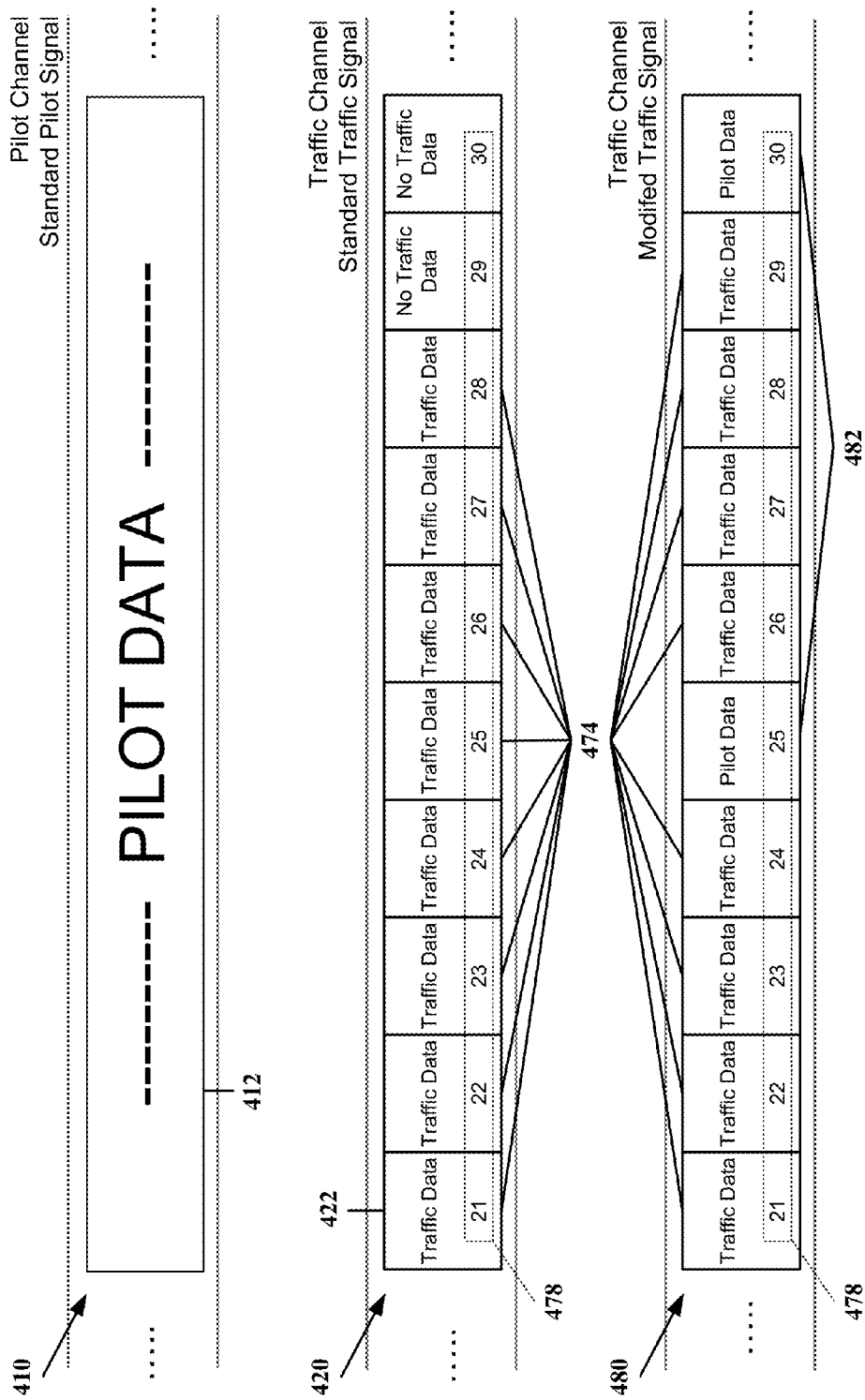

Alternatively, with reference to FIG. 4c, a particular packet-data communication service may be characterized by relatively longer periods of continuous data transmission, as depicted by traffic signal 474 transmitted during time slots 21-28. Thus, it may be desirable to transmit pilot data 412 contemporaneously with traffic signal 474. For example, modified pilot signal 482 may be inserted into traffic signal 474, and transmitted during time slot 25. Consequently, traffic signal 474 may be transmitted during time slots 21-24, and time slots 26-29, as opposed to continuously during time slots 21-28. As a result, the entirety of traffic signal 474 may not be received until time slot 29, as opposed to being received in its entirety by time slot 28. However, those skilled in the art will appreciate that such a delay may not be particularly disruptive to a packet-data communication service for which the timely delivery of traffic data 422 may not be as critical as it would be in, e.g., a voice communication service.

Nonetheless, note that method 300 disclosed herein with reference to FIG. 3 may be carried out when the traffic channel is providing any communication service, including, but not limited to, a packet-data communication service and/or a voice communication service. Also note that a more detailed description of step 340, as well as FIGS. 4a-c, can be found below.

ii. Determination Based on Location and/or Mobility of the WCD

Returning again to step 330, the determination to operate in the alternative transmission mode may also, or may alternatively, comprise a determination that a mobility of WCD 102 is below a mobility threshold. The mobility of WCD 102, and the corresponding mobility threshold, may be evaluated by access node 105 according to any unit of measure suitable for analyzing the mobility of WCD 102 including, but not limited to, an average speed of WCD 102, an average acceleration of WCD 102, an average displacement of WCD 102, or a combination of any such measures.

As discussed further below, while access node 105 operates in the alternative transmission mode, WCD 102 may rely on intermittent pilot data transmitted on the traffic channel, as opposed to continuous pilot data transmitted on the pilot channel, to decode standard traffic signal 420. Those skilled in the art will therefore appreciate that the alternative transmission mode may not be conducive to WCD 102 being highly mobile. Generally, as the mobility of a given wireless-communication device increases, the wireless-communication device may require, with increasing frequency, updates of the PN offset for the purposes of successfully decoding traffic data 422 received on the traffic channel.

Figure 5:
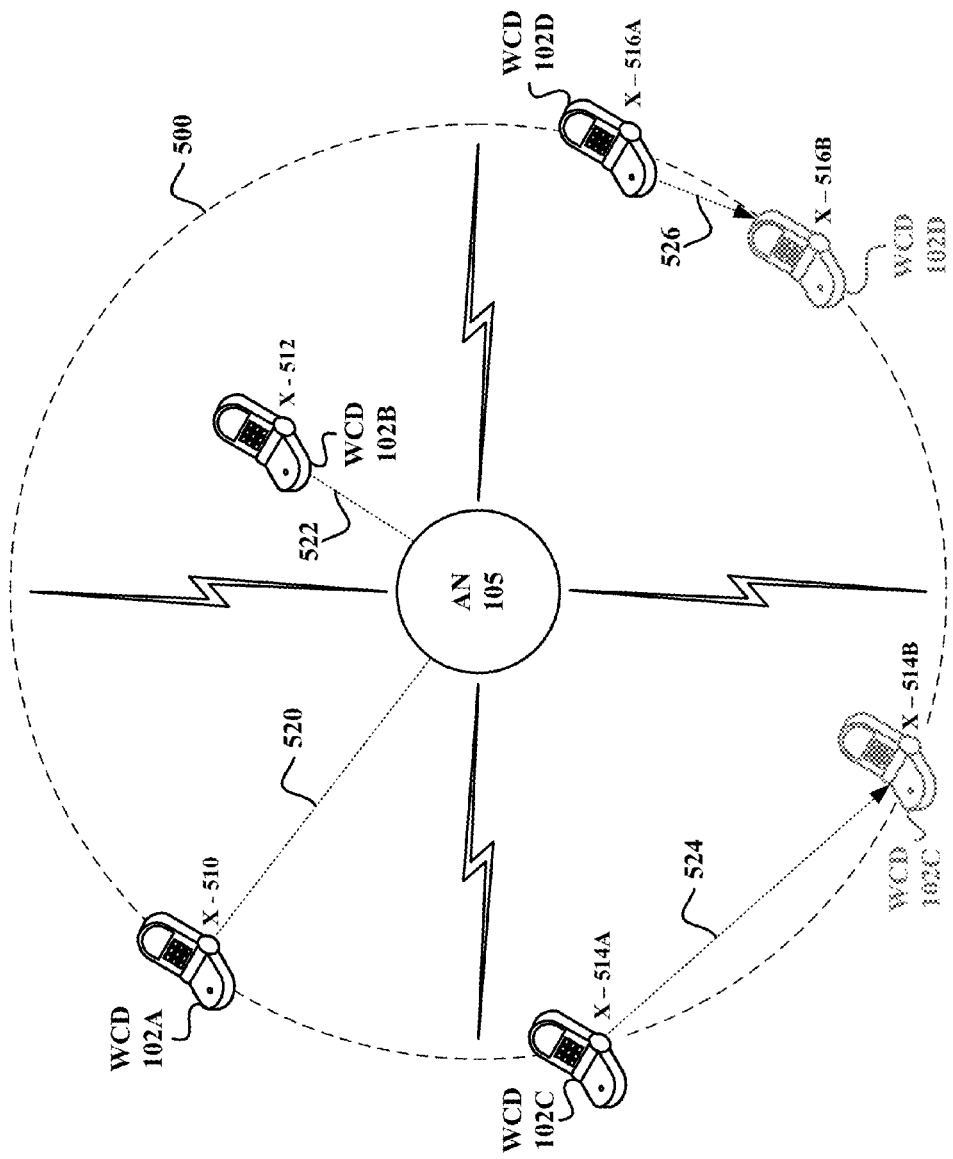
FIG. 5 is a block diagram depicting wireless-communication devices in a coverage area, in accordance with at least one embodiment.

Accordingly, the determination made by access node 105 to operate in the alternative transmission mode may be based at least in part on at least one approximation of a location of WCD 102. For purposes of explanation, FIG. 5 depicts a coverage area 500 of access node 105. FIG. 5 also depicts wireless-communication devices WCD 102A and WCD 102B, each positioned at approximate locations marked by respective X's 510 and 512. Correspondingly, WCD 102A is a distance 520 from access node 105 and WCD 102B is a distance 522 from access node 105, wherein distance 520 is greater than distance 522. More particularly, distance 520 is approximately equal to the radius of coverage area 500, and therefore WCD 102A is situated approximately on the boundary of coverage area 500. In contrast, distance 522 is a distance considerably less than the radius of coverage area 500, and therefore WCD 102B is situated well within the coverage area 500.

Accordingly, as one example, access node 105 may determine to operate in the alternative transmission mode because the approximation of the location of WCD 102A indicates that WCD 102A is near, at, or beyond the coverage area 500. In contrast, with respect to WCD 102B, access node 105 may not determine to operate in the alternative transmission mode because the approximation of the location of WCD 102B indicates that WCD 102B is well within the coverage area 500. Of course, access node 105 may be configured to make the determination to operate in the alternative transmission mode based on any given location approximation, or corresponding distance of a wireless-communication device from access node 105, including a distance 522, a distance less than distance 522, or any distance greater than distance 522. Therefore, the examples discussed herein should not be taken to be limiting.

In one embodiment, the approximation of the location of WCD 102 may be based on a power of the standard pilot signal 410 as received by WCD 102. For example, WCD 102 may be configured to monitor the power of standard pilot signal 410 transmitted by access node 105, and periodically store a value of the received power of standard pilot signal 410 for reporting to access node 105. In general, as WCD 102 moves away from access node 105, the power of standard pilot signal 410 as received by WCD 102 will decrease and may therefore provide an approximation of the distance of WCD 102 from access node 105. The power of standard pilot signal 410 as received by WCD 102 may be reported to access node 105 in a message transmitted from WCD 102 and received by access node 105.

In another embodiment, the approximation of the location of WCD 102 may be based on a phase shift of signals received from WCD 102 on the reverse link. For example, access node 105 may be configured to monitor the phase shift of signals received from WCD 102, and periodically store a value of the phase shift of signals received from WCD 102. In general, as WCD 102 moves away from access node 105, the phase shift of signals received from WCD 102 on the reverse link will change and may therefore also provide an approximation of the distance of WCD 102 from access node 105.

In still another embodiment, the approximation of the location of WCD 102 may be based on Global Positioning System (GPS) location information. For example, either access node 105, or WCD 102, may be configured with GPS functionality by which access node 105 and/or WCD 102 may receive GPS location information comprising information related to the location of WCD 102. A distance of WCD 102 from access node 105 may be inferred from such GPS location information. Further, such GPS location information may provide a substantially accurate approximation of the absolute location of WCD 102, as opposed to a mere approximation of the distance of WCD 102 from access node 105.

Such an approximation of the absolute location of WCD 102 may be utilized when the determination to operate in the alternative transmission mode comprises a determination that a mobility of WCD 102 is below a mobility threshold. The determination that the mobility of WCD 102 is below the mobility threshold may be based at least in part on at least two approximations of the location of the wireless-communication device. With reference to FIG. 5, for example, access node 105 may be configured to infer that WCD 102D, depicted as moving from approximate location 516A to approximate location 516B during a given time period t, has moved a distance 526. Access node 105 may therefore, for example, be configured to infer that WCD 102D has a mobility equal to distance 526 divided by time period t.

With further reference to FIG. 5, access node 105 may correspondingly be configured to infer that WCD 102C, depicted as moving from approximate location 514A to approximate location 514B during the given time period t, has moved a distance 524, wherein distance 524 is greater than distance 526. Access node 105 may therefore correspondingly infer that WCD 102C has a mobility equal to distance 524 divided by time period t. Given that distance 524 is greater than distance 526, access node 105 may determine that WCD 102C is associated with a mobility greater than that which is associated with WCD 102D.

In one embodiment, the mobility threshold may be set at a value that is less than the mobility associated with WCD 102C, and greater than the mobility associated with WCD 102D. Accordingly, with respect to WCD 102D, access node 105 may make the determination to operate in the alternative transmission mode, whereas with respect to WCD 102C, access node 105 may not make the determination to operate in the alternative transmission mode.

In another embodiment, the mobility threshold may be set at a value that is less than both the mobility associated with WCD 102C and the mobility associated with WCD 102D. Accordingly, access node 105 may not make the determination to operate in the alternative transmission mode with respect to both WCD 102C and WCD 102D.

In still another embodiment, the mobility threshold may be set at a value that is greater than both the mobility associated with WCD 102C and the mobility associated with WCD 102D. Accordingly, access node 105 may make the determination to operate in the alternative transmission mode with respect to both WCD 102C and WCD 102D.

It should be noted that either the approximation of the location of WCD 102, or the inference of the mobility of WCD 102, may be based on only one of, or a combination of, GPS location information, a power of the standard pilot signal as received by WCD 102, a phase shift of signals received from WCD 102 on the reverse link, and/or any other approximation of the location of WCD 102. For example, approximating the location of WCD 102 may comprise approximating the distance of WCD 102 from access node 105 based only on the power of the standard pilot signal as received by WCD 102.

As another example, approximating the distance of WCD 102 from access node 105 may be based on an average of approximated distances associated respectively with a power of standard pilot signal 410 as received by WCD 102 and a phase shift of signals received from WCD 102. As another example still, inferring the mobility of WCD 102 may be based on only approximations of the distance of WCD 102 from access node 105, or may be based on more absolute location approximations provided, for example, by GPS location information.

iii. Determination Based on Message and/or Request from the WCD

Returning yet again to step 330, the determination to operate in the alternative transmission mode may also, or may alternatively, comprise a determination that a status message has been received at access node 105 from WCD 102, the status message indicating that WCD 102 is unsynced. For example, WCD 102 may be configured to detect a failure of WCD 102 to decode standard traffic signal 420, or to otherwise detect that WCD 102 is unsynced, and responsively send the status message to access node 105. In response to receiving the status message, access node 105 may determine to operate in the alternative transmission mode.

The determination to operate in the alternative transmission mode may also, or may alternatively, comprise a determination that a keep-alive message has not been received at access node 105 from WCD 102 for a threshold amount of time. For example, WCD 102 may be configured to periodically transmit a keep-alive message to access node 105, which, when received by access node 105, indicates that WCD 102 is adequately receiving data transmitted from access node 105. If such a keep-alive message is not received by access node 105 for a threshold time, access node 105 may determine to operate in the alternative transmission mode.

The determination to operate in the alternative transmission mode may also, or may alternatively, comprise a determination that WCD 102 has requested a traffic-channel power greater than a threshold traffic-channel power. For example, WCD 102 may be configured to determine that the power level at which access node 105 is transmitting standard traffic signal 420 is insufficient, and responsively request that access node 105 increase the power level at which standard traffic signal 420 is transmitted. If WCD 102 requests that access node 105 transmit standard traffic signal 420 at a power greater than a pre-determined threshold traffic-channel power, access node 105 may determine to operate in the alternative transmission mode. In one embodiment, the threshold traffic-channel power may be set equal to a maximum traffic-channel power. In another embodiment, the threshold traffic-channel power may be set equal to the power at which the standard pilot-signal 410 is transmitted.

d. Operate in Alternative Transmission Mode

At step 340, access node 105 operates in the alternative transmission mode. Operating in the alternative transmission mode may include at step 342, access node 105 generating modified traffic signal 450 (480) comprising standard traffic signal 420 and modified pilot signal 452 (482), and at step 344, access node 105 transmitting modified traffic signal 450 (480) over the traffic channel at a second power level, wherein the second power level is greater than the first power level (at which standard traffic signal 420 was initially transmitted). Operating in the alternative transmission mode may include additional steps as well, which may be performed independently or in combination with steps 332 and 334.

i. Generate Modified Traffic Signal

Operating in the alternative transmission mode may include, at step 342, generating a modified traffic signal, such as modified traffic signal 450 depicted in FIG. 4b or modified traffic signal 480 depicted in FIG. 4c. The modified traffic signal 450 (480) may comprise standard traffic signal 420 and a modified pilot signal such as modified pilot signal 452 (482).

For example, with reference to FIG. 4b, for a given time period, standard traffic signal 420 may include traffic data 422 transmitted in several of time slots 448 which, in FIG. 4b, have been respectively numbered 11-20. For the time period depicted, standard traffic signal 420 includes a first traffic signal 444 comprising traffic data 422 transmitted during time slots 11-15, and traffic signal 420 also includes a second traffic signal 446 comprising traffic data 422 transmitted during time slots 17-19. Further, no traffic data 422 is transmitted during time slot 16 or time slot 20.

In one embodiment, in accordance with FIG. 4b, modified traffic signal 450 may be generated by interleaving pilot data 412 between traffic data 422 during time slots in which no traffic data would otherwise be transmitted on the traffic channel. For example, FIG. 4b depicts modified traffic signal 450 comprising traffic signal 444 sent during time slots 11-15 and traffic signal 444 sent during time slots 17-19. Modified traffic signal 450 also comprises modified pilot signal 452 sent during time slots 16 and 20. Thus, modified pilot signal 452 is shown as interleaved between traffic signal 444 and traffic signal 446 of standard traffic signal 420 at time slot 16.

As another example, with reference to FIG. 4c, for a given time period, standard traffic signal 420 may include traffic data 422 transmitted in several of time slots 478 which, in FIG. 4c, have been respectively numbered 21-30. For the time period depicted, standard traffic signal 420 includes a single continuous traffic signal 474 comprising traffic data 422 transmitted during time slots 21-28. Further, no traffic data 422 is transmitted during time slot 29 or time slot 30.

In another embodiment, in accordance with FIG. 4c, modified traffic signal 480 may be generated by interleaving pilot data 412 with traffic data 422 during time slots in which traffic data otherwise would be transmitted on the traffic channel. In other words, the modified traffic signal may be generated by inserting modified pilot signal 482 in the standard traffic signal 420. For example, FIG. 4c depicts modified traffic signal 480 comprising traffic signal 474 sent during time slots 21-24 and time slots 26-29. Modified traffic signal 480 also comprises modified pilot signal 482 sent during time slots 25 and 30. Thus, modified pilot signal 482 is shown as inserted in traffic signal 474 of standard traffic signal 420 at time slot 25.

Generally, modified pilot signal 452 (482) may include some, or all, of pilot data 412 that is transmitted as standard pilot signal 410. Thus, modified pilot signal 452 (482) may comprise pilot data that is identical to pilot data 412 transmitted on the pilot channel during the time slots in which modified pilot signal 452 (482) is transmitted on the traffic channel. Alternatively, modified pilot signal 452 (482) may comprise pilot data that is only a portion of pilot data 412 that is transmitted on the pilot channel during the time slots in which modified pilot signal 452 (482) is transmitted on the traffic channel. In particular, modified pilot signal 452 (482) may include pilot data that indicates at least, or only, a PN offset.

It should be noted that the particular modified traffic signals described herein, including those described with respect to FIGS. 4b and 4c, are described for illustration only and should not be taken as limiting. In general, the modified traffic signal may comprise any combination of the standard traffic signal and a modified pilot signal that enables a wireless-communication device to receive pilot data 412 as well as traffic data 422 on the traffic channel.

ii. Transmit Modified Traffic Signal at Increased Power Level

Operating in the alternative transmission mode may further include, at step 344, transmitting modified traffic signal 450 (480) at a second power level that is greater than the first power level (at which standard traffic signal 420 was initially transmitted). For example, while standard traffic signal 420 may be transmitted on the traffic channel at a first power level while access node 105 operates in the standard transmission mode, modified traffic signal 450 (480) may be transmitted on the traffic channel at the second power level while access node 105 operates in the alternative transmission mode. The second power level may or may not be greater than a maximum power level at which standard traffic signal 420 may be transmitted on the traffic channel while access node 105 operates in the standard transmission mode. Further, the second power level may or may not be greater than the power level at which standard pilot signal 410 is transmitted on the pilot channel.

iii. Additional Alternative-Transmission-Mode Steps

Operating in the alternative transmission mode may be defined so as to include the step of returning to operating in the standard transmission mode after operating in the alternative transmission mode for a pre-determined amount of time. Alternatively, access node 105 may be configured to return to operating in the standard transmission mode after operating in the alternative transmission mode for a pre-determined amount of time, as a step in method 300 outside of access node 105 operating in the alternative transmission mode.

For example, access node 105 may be configured to return to operating in the standard transmission mode after a certain number of seconds or minutes have elapsed. Alternatively, access node 105 may be configured to return to operating in the standard transmission mode after a certain number of time slots, corresponding to a pre-determined amount of time, have elapsed. Further, access node 105 may be configured to return to operating in the standard transmission mode in response to any alternative suitable trigger, examples of which include, after access node 105 has transmitted a pre-determined amount of data while operating in the alternative transmission mode, after WCD 102 has sent to access node 105 a pre-determined number of messages indicating that WCD 102 is unsynced, or when the access node has entered into the alternative transmission mode with respect to a pre-determined number of additional wireless-communication devices.

Operating in the alternative transmission mode may further comprise the step of transmitting modified traffic signal 450 (480) on a periodic basis. For example, access node 105 may be configured to insert, or interleave, modified pilot signal 452 (482) into standard traffic signal 420, at pre-determined time intervals. The time interval at which the modified pilot signal is inserted may vary according to the needs of the particular wireless-communication device that receives modified traffic signal 450 (480). In fact, a period of the periodic basis on which modified traffic signal 450 (480) is transmitted may be reduced in response to receiving at the access node from WCD 102 a status message that indicates that WCD 102 is unsynced. Accordingly, WCD 102 may receive the modified traffic signal more frequently.

Operating in the alternative transmission mode, and more particularly transmitting the modified traffic signal, may further comprise transmitting modified traffic signal 450 (480) upon receiving at access node 105 from WCD 102 a status message that indicates that WCD 102 is unsynced. Thus, instead of, or in addition to, transmitting modified traffic signal 450 (480) on a periodic basis, access node 105 may transmit modified traffic signal 450 (480) upon receiving from WCD 102 an indication that modified traffic signal 450 (480) is needed.

It should be noted that any of the steps described above as part of operating in the alternative transmission mode may be performed by access node 105 independently or in combination. Other steps may be possible as well, which may also be performed by access node 105 independently or in combination with the steps described herein.

Additionally, while much of method 300 has been described with respect to WCD 102, it should be understood that all, or parts, of method 300 may also be carried out with respect to a plurality of wireless-communication devices. Thus, access node 105 may transmit a plurality of additional standard traffic signals over a plurality of respective additional traffic channels. Further, operating in the alternative transmission mode may comprise access node 105 generating a plurality of respective additional modified traffic signals, each comprising a respective additional standard traffic signal and the modified pilot signal. Operating in the alternative transmission mode may further comprise access node 105 transmitting each respective additional modified traffic signal over its respective additional traffic channel.

Correspondingly, the determination to operate in the alternative transmission mode may comprise a determination that the traffic channel and each additional traffic channel are each providing a packet-data communication service to respective wireless-communication devices. Further the determination to operate in the alternative transmission mode may comprise a determination that a mobility of each such device is below a mobility threshold.

3. A Second Exemplary Method

Figure 6:
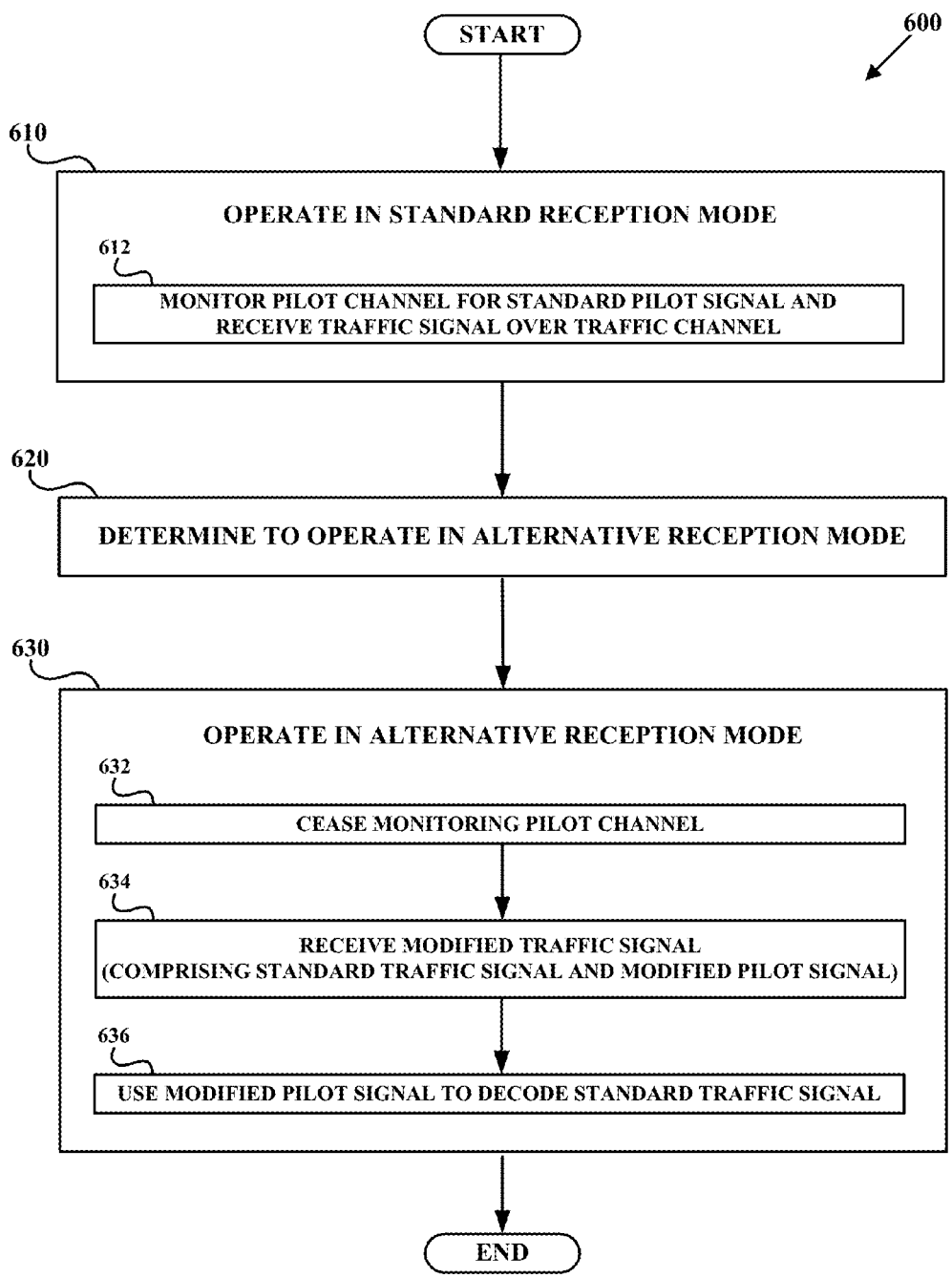
FIG. 6 is a flow chart illustrating an additional method, in accordance with at least one embodiment.

Corresponding to the method described with reference to FIG. 3, FIG. 6 depicts a second exemplary method that may be carried out by a wireless-communication device such as WCD 102. Although method 600 is described herein as being carried out by WCD 102, method 600 may be carried out by any device arranged to carry out the wireless-communication-device functions described herein.

a. Operate in Standard Reception Mode

At step 610, WCD 102 initially operates in a standard reception mode. Operating in the standard reception mode comprises, at step 612, monitoring the pilot channel for standard pilot signal 410, and receiving standard traffic signal 420 over the traffic channel. As discussed above, with respect to method 300, access node 105 will generally initially transmit standard pilot signal 410 over the pilot channel and transmit standard traffic signal 420 over the traffic channel. While operating in the standard reception mode, WCD 102 may use a PN offset indicated by pilot data 412 to decode traffic data 422. WCD 102 may also engage in other activities while operating in the standard reception mode as well.

Also of note, any of the actions described with respect to method 300 as being carried about by WCD 102 may also be carried out by WCD 102 while operating in the standard reception mode.

b. Determine to Operate in Alternative Reception Mode

At step 620, WCD 102 makes a determination to operate in an alternative reception mode. In general, WCD 102 may determine to operate in the alternative reception mode for the purpose of improving the reception of pilot data 412 and/or traffic data 422. WCD 102 may determine to operate in the alternative reception mode for other purposes as well.

The determination by WCD 102 to operate in the alternative reception mode may comprise a determination by WCD 102 that it cannot decode standard traffic signal 420 by using standard pilot signal 410. For example, WCD 102 may attempt to use a PN offset indicated by pilot data 412 to decode traffic data 422. However, WCD 102 may not have received all or part of pilot data 412, and therefore may not be able to sufficiently decode standard traffic signal 420 despite having received traffic data 422. Alternatively, WCD 102 may not have received all or part of traffic data 422, and therefore may not be able to sufficiently decode standard traffic signal 420, despite having received pilot data 412. Further, WCD 102 may not have received all or part of both pilot data 412 and traffic data 422, and therefore may not be able to sufficiently decode standard traffic signal 420.

c. Operate in Alternative Reception Mode

At step 630, WCD 102 operates in the alternative reception mode, which may include (at step 632) ceasing monitoring the pilot channel for standard pilot signal 410, (at step 634) receiving over the traffic channel modified traffic signal 450 (480), and (at step 636) using modified pilot signal 452 (482) to decode standard traffic signal 420. And operating in the alternative reception mode may also include additional steps which may be performed independently or in combination with steps 632-636.

Also of note, any of the actions described with respect to method 300 as being carried about by WCD 102 may also be carried out by WCD 102 while operating in the alternative reception mode.

i. Cease Monitoring Pilot Channel

Operating in the alternative transmission mode may include, (at step 632) ceasing monitoring the pilot channel for standard pilot signal 410. As will be described further below, while operating in the alternative reception mode, WCD 102 may receive modified traffic signal 450 (480) which includes modified pilot signal 452 (482) comprising pilot data 412. Accordingly, while operating in the alternative reception mode, WCD 102 may not require standard pilot signal 410 for the purposes of decoding traffic data 422.

ii. Receive Modified Traffic Signal

Operating in the alternative reception mode may further include, at step 634, receiving over the traffic channel modified traffic signal 450 (480). As discussed above, with reference to method 300, access node 105 may transmit modified traffic signal 452 (482) as part of step 344 while operating in the alternative transmission mode. WCD 102 may be configured to receive modified traffic signal 450 (480) on the traffic channel in a manner that is the same as, similar to, or different from the manner in which it receives standard traffic signal 420.

iii. Use Modified Traffic Signal to Decode Standard Traffic Signal

Operating in the alternative reception mode may further include, (at step 636) using the modified pilot signal 452 (482) to decode the standard traffic signal 420. For example, with respect to FIG. 4b, WCD 102 may use pilot data 412 contained in modified pilot signal 452 to decode traffic signals 444 and 446. As another example, with respect to FIG. 4c, WCD 102 may use pilot data 412 contained in modified pilot signal 482 to decode traffic signal 474. More particularly, WCD 102 may use a PN offset indicated in pilot data 412 to decode any traffic signal contained in standard traffic signal 420, including traffic signals 444, 446, or 474.

iv. Additional Alternative-Reception-Mode Steps

Operating in the alternative reception mode may further include, prior to receiving the modified traffic signal, detecting a failure to decode the standard traffic signal and requesting modified traffic signal 450 (480) from access node 105. For example, while operating in the alternative reception mode, WCD 102 may determine that it cannot decode standard traffic signal 420 using the last modified pilot signal that it received. In response to such a determination, WCD 102 may directly request that access node 105 transmit a modified pilot signal 452 (482) on the traffic channel, including pilot data 412 indicating an updated PN offset. Accordingly, upon receiving modified traffic signal 450 (480) at step 634, WCD 102 may successfully use modified pilot signal 452 (482) to decode standard traffic signal 420.

Further, using the modified pilot signal to decode the standard traffic signal may further comprise determining a corrected PN-phase offset based on at least the modified pilot signal 452 (482) and an approximation of a location of WCD 102. WCD 102 may then use the corrected PN-phase offset to decode standard traffic signal 420. For example, with reference to FIG. 4b, WCD 102 receives pilot data at time slot 16, and does not again receive pilot data until time slot 20. Assuming the pilot data received at time slot 16 indicates a PN offset, the PN offset may be correct in relation to traffic data to be decoded at time slots immediately following time slot 16, such as time slot 17 or even time slot 18. However due to the mobility of WCD 102, the PN offset may be incorrect in relation to traffic data to be decoded at, for example, time slot 19.

Thus, for the purposes of decoding traffic data at time slot 19, WCD 102 may determine a corrected PN-phase offset based on modified pilot signal 452, last received at time slot 16, and an approximation of the location of WCD 102. More specifically, WCD 102 may use an approximation of the location of WCD 102 at time slot 16, as well as an approximation of the location of WCD 102 at time slot 19, to infer a distance that WCD 102 has moved during time slots 16-19. WCD 102 may also infer a distance that WCD 102 has moved away or towards access node 105 during time slots 16-19. Those skilled in the art will appreciate that either such distance may be used by WCD 102, at the application layer of WCD 102, to extrapolate a corrected PN-phase offset that may be used to decode, for example, traffic data transmitted at time slot 19. Approximations of the location of WCD 102 may be obtained by WCD 102 by means similar to those discussed above with respect to FIG. 5. Approximations of the location of WCD 102 may be obtained by alternative means as well.

4. Conclusion

Various exemplary embodiments have been described above. Those skilled in the art will understand, however, that changes and modifications may be made to those examples without departing from the scope of the claims.

The invention claimed is:

1. A method comprising:
an access node transmitting a standard pilot signal over a pilot channel;
the access node initially operating in a standard transmission mode, wherein operating in the standard transmission mode comprises transmitting a standard traffic signal over a traffic channel at a first power level;
while operating in the standard transmission mode, the access node making a determination to operate in an alternative transmission mode, wherein the determination to operate in the alternative transmission mode includes a determination that a wireless-communication device has requested a traffic-channel power greater than a threshold traffic-channel power; and
responsive to making the determination to operate in the alternative transmission mode, the access node operating in the alternative transmission mode while transmitting the standard pilot signal over the pilot channel, wherein operating in the alternative transmission mode comprises: (A) generating a modified traffic signal comprising (i) the standard traffic signal and (ii) a modified pilot signal, and (B) transmitting the modified traffic signal over the traffic channel at a second power level, wherein the second power level is greater than the first power level.

2. The method of claim 1, wherein the determination to operate in the alternative transmission mode comprises (i) a determination that the traffic channel is providing a packet-data communication service to a wireless-communication device and (ii) a determination that a mobility of the wireless-communication device is below a mobility threshold.

3. The method of claim 2, wherein the method is carried out in a 1x wireless-communication network.

4. The method of claim 1, wherein the determination to operate in the alternative transmission mode comprises a determination that the traffic channel is providing a packet-data communication service to a wireless-communication device.

5. The method of claim 1, wherein the determination to operate in the alternative transmission mode comprises a determination that a mobility of a wireless-communication device is below a mobility threshold.

6. The method of claim 1, wherein the determination to operate in the alternative transmission mode is based on at least one approximation of a location of the wireless-communication device.

7. The method of claim 6, wherein at least one approximation of the location of the wireless-communication device is based on at least one of (i) Global Positioning System (GPS) location information, (ii) a power of the standard pilot signal as received by the wireless-communication device, and (iii) a phase shift of signals received from the wireless-communication device on a reverse link.

8. The method of claim 7, wherein the determination to operate in the alternative transmission mode further comprises a determination that a mobility of the wireless-communication device is below a mobility threshold, wherein the determination that the mobility of the wireless-communication device is below the mobility threshold is based on at least two approximations of the location of the wireless-communication device.

9. The method of claim 1, wherein the determination to operate in the alternative transmission mode comprises a determination that a status message has been received at the access node from the wireless-communication device, the status message indicating that the wireless-communication device is unsynced.

10. The method of claim 1, wherein the determination to operate in the alternative transmission mode comprises a determination that a keep-alive message has not been received at the access node from a wireless-communication device for a threshold amount of time.

11. The method of claim 1, wherein the threshold traffic-channel power is set equal to either (i) a maximum traffic-channel power or (ii) a standard pilot-signal power.

12. The method of claim 1, wherein generating the modified traffic signal comprises inserting the modified pilot signal in the standard traffic signal.

13. The method of claim 1, wherein the modified pilot signal includes a pseudorandom number (PN) offset.

14. The method of claim 1, further comprising the access node returning to operating in the standard transmission mode after operating in the alternative transmission mode for a pre-determined amount of time.

15. The method of claim 1, wherein operating in the alternative transmission mode further comprises transmitting the modified traffic signal on a periodic basis.

16. The method of claim 15, wherein a period of the periodic basis is reduced in response to receiving at the access node from the wireless-communication device a status message that indicates that the wireless-communication device is unsynced.

17. The method of claim 1, wherein transmitting the modified traffic signal comprises transmitting the modified traffic signal upon receiving at the access node from the wireless-communication device a status message that indicates that the wireless-communication device is unsynced.

18. The method of claim 1, further comprising:
the access node transmitting a plurality of additional standard traffic signals over a plurality of respective additional traffic channels, wherein operating in the alternative transmission mode further comprises:
generating a plurality of respective additional modified traffic signals, each comprising (i) a respective additional standard traffic signal and (ii) the modified pilot signal; and
transmitting each respective additional modified traffic signal over its respective additional traffic channel.

19. The method of claim 18, carried out in a 1x wireless-communication network, wherein the determination to operate in the alternative transmission mode comprises (i) a determination that the traffic channel and each additional traffic channel are each providing a packet-data communication service to respective wireless-communication devices and (ii) a determination that a mobility of each such device is below a mobility threshold.

20. A method comprising:
an access node transmitting a standard pilot signal over a pilot channel;
the access node initially operating in a standard transmission mode, wherein operating in the standard transmission mode comprises transmitting a standard traffic signal over a traffic channel at a first power level;
while operating in the standard transmission mode, the access node making a determination to operate in an alternative transmission mode, wherein the determination to operate in the alternative transmission mode comprises a determination that a status message has been received at the access node from a wireless-communication device, the status message indicating that the wireless-communication device is unsynced; and
responsive to making the determination to operate in the alternative transmission mode, the access node operating in the alternative transmission mode while transmitting the standard pilot signal over the pilot channel, wherein operating in the alternative transmission mode comprises: (A) generating a modified traffic signal comprising (i) the standard traffic signal and (ii) a modified pilot signal, and (B) transmitting the modified traffic signal over the traffic channel at a second power level, wherein the second power level is greater than the first power level.

21. A method comprising:
an access node transmitting a standard pilot signal over a pilot channel;
the access node initially operating in a standard transmission mode, wherein operating in the standard transmission mode comprises transmitting a standard traffic signal over a traffic channel at a first power level;
while operating in the standard transmission mode, the access node making a determination to operate in an alternative transmission mode; and
responsive to making the determination, the access node operating in the alternative transmission mode while transmitting the standard pilot signal over the pilot channel, wherein operating in the alternative transmission mode comprises: (A) generating a modified traffic signal comprising (i) the standard traffic signal and (ii) a modified pilot signal, and (B) transmitting the modified traffic signal over the traffic channel at a second power level and on a periodic basis, wherein the second power level is greater than the first power level, and wherein a period of the periodic basis is reduced in response to receiving at the access node from a wireless-communication device a status message that indicates that the wireless-communication device is unsynced.

22. A method comprising:
an access node transmitting a standard pilot signal over a pilot channel;
the access node initially operating in a standard transmission mode, wherein operating in the standard transmission mode comprises transmitting a standard traffic signal over a traffic channel at a first power level;
while operating in the standard transmission mode, the access node making a determination to operate in an alternative transmission mode; and
responsive to making the determination, the access node operating in the alternative transmission mode while transmitting the standard pilot signal over the pilot channel, wherein operating in the alternative transmission mode comprises: (A) generating a modified traffic signal comprising (i) the standard traffic signal and (ii) a modified pilot signal, and (B) transmitting the modified traffic signal over the traffic channel at a second power level,
wherein the second power level is greater than the first power level, and
wherein transmitting the modified traffic signal comprises transmitting the modified traffic signal upon receiving at the access node from a wireless-communication device a status message that indicates that the wireless-communication device is unsynced.

* * * * *